United States Patent
Shi et al.

(10) Patent No.: US 11,792,407 B2
(45) Date of Patent: Oct. 17, 2023

(54) METHOD AND DEVICE FOR CODING VIDEO USING OPTIMAL VIDEO FRAME STRUCTURE, AND STORAGE MEDIUM

(71) Applicant: Beijing Baidu Netcom Science and Technology Co., Ltd., Beijing (CN)

(72) Inventors: Le Shi, Beijing (CN); Wenpeng Ding, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 5 days.

(21) Appl. No.: 17/353,329

(22) Filed: Jun. 21, 2021

(65) Prior Publication Data

US 2021/0377543 A1  Dec. 2, 2021

(30) Foreign Application Priority Data

Oct. 30, 2020 (CN) .......................... 202011192362.7

(51) Int. Cl.
| | |
|---|---|
| *H04N 19/14* | (2014.01) |
| *H04N 19/105* | (2014.01) |
| *H04N 19/159* | (2014.01) |
| *H04N 19/172* | (2014.01) |

(52) U.S. Cl.
CPC .......... *H04N 19/14* (2014.11); *H04N 19/105* (2014.11); *H04N 19/159* (2014.11); *H04N 19/172* (2014.11)

(58) Field of Classification Search
CPC .... H04N 19/136; H04N 19/172; H04N 19/14; H04N 19/105; H04N 19/159
See application file for complete search history.

(56) References Cited

U.S. PATENT DOCUMENTS

| | | | |
|---|---|---|---|
| 2006/0233237 A1* | 10/2006 | Lu | .......................... H04N 19/61 |
| | | | 375/E7.181 |
| 2007/0242748 A1 | 10/2007 | Mahadevan et al. | |
| 2008/0232468 A1 | 9/2008 | Kwon et al. | |
| 2013/0219443 A1 | 8/2013 | Argyropoulos et al. | |

(Continued)

FOREIGN PATENT DOCUMENTS

| | | |
|---|---|---|
| CN | 1898965 A | 1/2007 |
| CN | 101960854 A | 1/2011 |
| CN | 103053134 A | 4/2013 |

OTHER PUBLICATIONS

Dumitras, Adriana et al., "I/P/B Frame Type Decision by Collinearity of Displacements," International Conference on Image Processing, vol. 4, pp. 2769-2772 (2004).

(Continued)

*Primary Examiner* — Kyle M Lotfi
(74) *Attorney, Agent, or Firm* — Kilpatrick Townsend & Stockton LLP

(57) ABSTRACT

A method, apparatus, device and medium for coding a video are provided. An implementation plan includes: determining an initial video frame structure based on a preset threshold for a B-frame number; in response to determining that the initial video frame structure meets a preset condition, shortening the initial video frame structure to obtain a candidate video frame structure set; determining a target video frame structure from the candidate video frame structure set; and performing video coding on video frames in a to-be-coded video frame sequence according to the target video frame structure.

14 Claims, 5 Drawing Sheets

(56) References Cited

U.S. PATENT DOCUMENTS

2014/0219350 A1\* 8/2014 Liao .................. H04N 19/107
375/240.27
2018/0184084 A1 6/2018 Jeon et al.
2020/0128255 A1\* 4/2020 Halepovic ............ H04N 19/176

OTHER PUBLICATIONS

Liu, Zhenyu, et al., "Optimize x265 Rate Control: An Exploration of Lookahead in Frame Bit Allocation and Slice Type Decision," IEEE Transactions on Image Processing, vol. 28, pp. 2558-2573 (2019).
UKIPO Combined Search and Examination Report dated Mar. 7, 2022 in related GB Patent Application No. GB2108275.5 (ten pages).
Ma, Li-Ni et al., "An Adaptively Referenced Frame Scheme for Multi-View Video Coding," Department of Computer Science, Beijing Information Science and Technology University, Beijing, China 100085; Computer Engineering & Science, vol. 31,No. 3, pp. 1-3 (2009).
Guo, Hongwei et al., "Optimal Bit Allocation at Frame Level for Rate Control in HEVC," IEEE Transactions on Broadcasting, 0018-9316, pp. 1-12 (Jul. 2018).

\* cited by examiner

METHOD AND DEVICE FOR CODING VIDEO USING OPTIMAL VIDEO FRAME STRUCTURE, AND STORAGE MEDIUM

CROSS-REFERENCE TO RELATED APPLICATIONS

This application claims priority to Chinese Patent Application No. 202011192362.7, filed with the China National Intellectual Property Administration (CNIPA) on Oct. 30, 2020, the content of which is incorporated herein by reference in its entirety.

TECHNICAL FIELD

The present disclosure relates to the field of computer technology, particularly to the field of video coding, and more particularly to a method and apparatus for coding a video, a device and medium.

BACKGROUND

At present, when a device encodes a video, it requires to construct video frames of a plurality of frame types to form consecutive video frames. The frame types may include I frame, P frame, B frame and Bref frame. Bref frame is a special B frame and can be used as a reference frame.

Nowadays, when constructing a video frame structure for video coding, a fixed video frame structure is usually used. For example, the B frame in the middle position of the region of consecutive B frames in a video frame structure is replaced with a Bref frame. By coding a video in this fixed video frame structure, an interval between the B frame and the reference frame may be reduced and the coding performance may be improved.

SUMMARY

A method, apparatus, device and medium for coding a video are provided.

According to a first aspect, some embodiments of the present disclosure provide a method for coding a video. The method include: determining an initial video frame structure based on a preset threshold for a B-frame number; in response to determining that the initial video frame structure meets a preset condition, shortening the initial video frame structure to obtain a candidate video frame structure set; determining a target video frame structure from the candidate video frame structure set; and performing video coding on video frames in a to-be-coded video frame sequence according to the target video frame structure.

According to a second aspect, some embodiments of the present disclosure provide an apparatus for coding a video. The apparatus includes: a first determination unit, configured to determine an initial video frame structure based on a preset threshold for a B-frame number; a shortening unit, configured to shorten, in response to determining that the initial video frame structure meets a preset condition, the initial video frame structure to obtain a candidate video frame structure set; a second determination unit, configured to determine a target video frame structure from the candidate video frame structure set; and a video coding unit, configured to perform video coding on video frames in a to-be-coded video frame sequence according to the target video frame structure.

According to a third aspect, some embodiments of the present disclosure provide an electronic device for coding a video. The electronic device includes: one or more processors; and a storage apparatus, storing one or more programs thereon, the one or more programs, when executed by the one or more processors, cause the one or more processors to implement any one of the methods for coding a video according to the first aspect.

According to a fourth aspect, some embodiments of the present disclosure provide a computer readable storage medium, storing computer instructions executable by a computer, the computer instructions being used to cause the computer to perform the method according to any one of the methods for coding a video according to the first aspect.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure, in which.

DETAILED DESCRIPTION OF EMBODIMENTS

The following describes exemplary embodiments of the present disclosure in conjunction with the accompanying drawings, which includes various details of the embodiments of the present disclosure to facilitate understanding, and they should be considered as merely exemplary. Therefore, those of ordinary skill in the art should recognize that various changes and modifications may be made to embodiments described herein without departing from the scope and spirit of the present disclosure. Also, for clarity and conciseness, descriptions of well-known functions and structures are omitted in the following description.

It should be noted that embodiments in the present disclosure and the features in embodiments may be combined with each other on a non-conflict basis. Embodiments of the present disclosure will be described below in detail with reference to the accompanying drawings and in combination with the embodiments.

Figure 1:
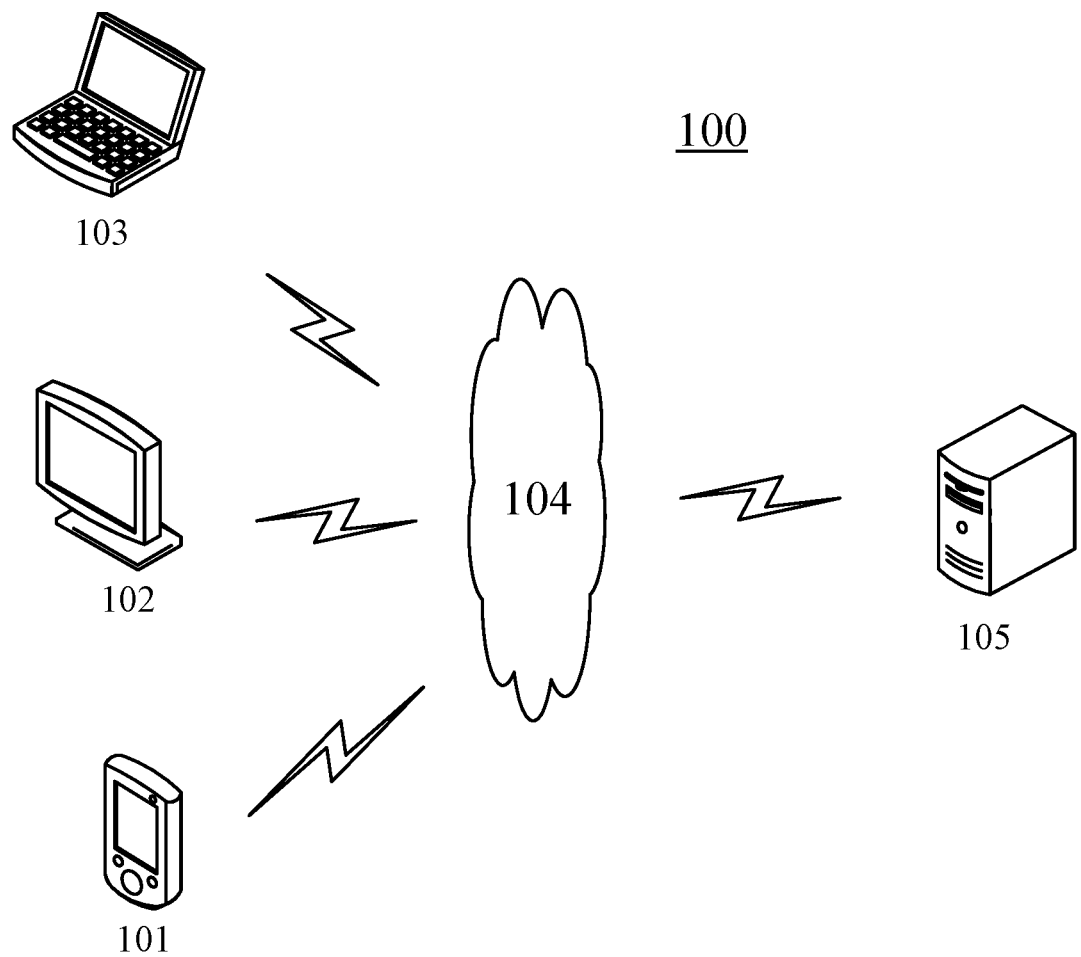
FIG. 1 is diagram of an example system architecture to which an embodiment of the present disclosure may be implemented.

FIG. 1 shows an example system architecture 100 to which a method for coding a video or an apparatus for coding a video may be applied.

As shown in FIG. 1, the system architecture 100 may include terminal devices 101, 102 and 103, a network 104 and a server 105. The network 104 may be used to provide a communication link medium between the terminal devices 101, 102 and 103 and the server 105. The network 104 may include various types of connections, such as wired, wireless communication links, or optical fibers.

A user may use the terminal device 101, 102, or 103 to interact with the server 105 through the network 104 to receive or send messages, and so on. The terminal devices 101, 102, 103 may be electronic devices such as video coders, TVs, computers, and tablets. The terminal devices 101, 102, and 103 may store a to-be-coded video frame sequence, and the terminal devices 101, 102, and 103 may determine a target video frame structure used in video coding of the to-be-coded video frame sequence, and code video frames in the to-be-coded video frame sequence based on the target video frame structure. The determining the target video frame structure may include: first determining an initial video frame structure based on a threshold for a preset B-frame number; shortening the initial video frame structure in response to determining that the initial video frame structure meets a preset condition, to obtain a candidate video frame structure set; and determining the target video frame structure from the candidate video frame structure set.

The terminal devices 101, 102 and 103 may be hardware or software. When the terminal devices 101, 102 and 103 are hardware, they may be various electronic devices, including but not limited to video coders, TVs, smart phones, tablet computers, e-book readers, on-board computers, laptop computers, desktop computers and so on. When the terminal devices 101, 102 and 103 are software, they may be installed in the above-listed electronic devices. They may be implemented as a plurality of software or software modules (e.g., to provide distributed services) or as a single software or software module, which is not limited herein.

The server 105 may be a server that provides various services, for example, acquiring a coded video frame sequence sent by the terminal device 101, 102, or 103, where the coded video frame sequence is a sequence obtained by the terminal device 101, 102, or 103 by coding the video frames in the to-be-coded video frame sequence according to the target video frame structure. The server 105 may store the coded video frame sequence in a database, and when a read instruction directing to the coded video frame sequence is detected, a corresponding video may be displayed based on the coded video frame sequence.

It should be noted that the server 105 may be hardware or software. When the server 105 is hardware, it may be implemented as a distributed server cluster composed of a plurality of servers, or as a single server. When the server 105 is software, it may be implemented as a plurality of software or software modules (e.g., to provide distributed services), or as a single software or software module, which is not limited herein.

It should be noted that the method for coding a video provided in embodiments of the present disclosure is generally performed by the terminal device 101, 102 or 103. Correspondingly, the apparatus for coding a video is generally provided in the terminal device 101, 102 or 103.

It should be understood that the number of terminal devices, networks, and servers in FIG. 1 is merely illustrative. Depending on the implementation needs, there may be any number of terminal devices, networks and servers.

Figure 2:
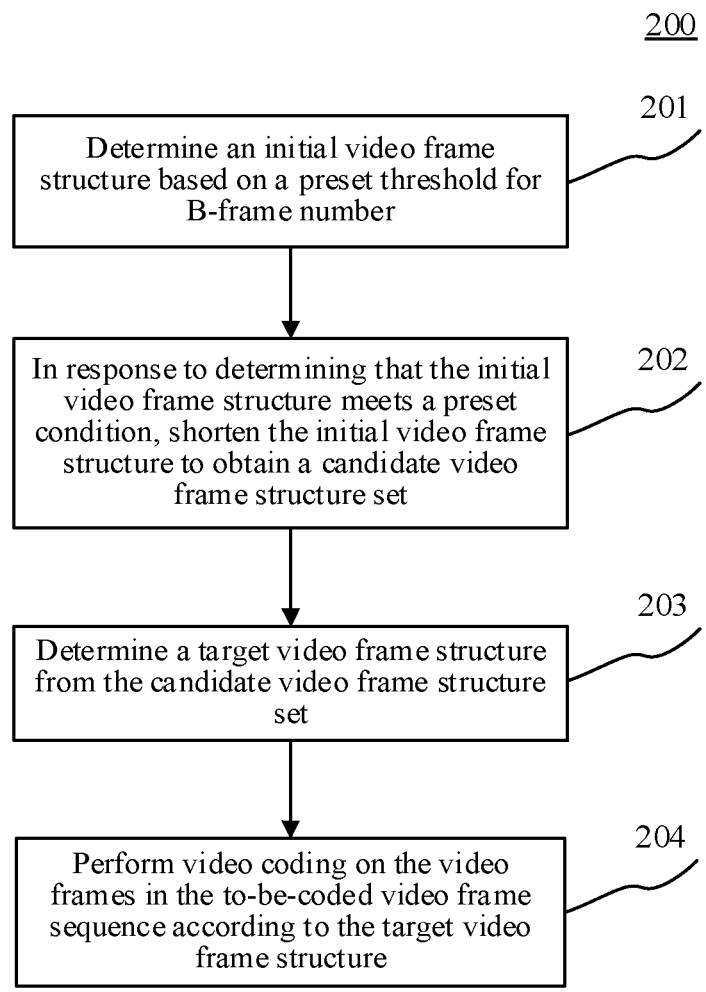
FIG. 2 is a flowchart of a method for coding a video according to an embodiment of the present disclosure.

With further reference to FIG. 2, illustrating a flow 200 of a method for coding a video according to an embodiment of the present disclosure. The method for coding a video of the present embodiment includes the following steps:

Step 201, determining an initial video frame structure based on a preset threshold for the B-frame number.

In the present embodiment, the preset threshold for the B-frame number may be a set maximum number of B frames, and an executing body (such as the terminal device 101, 102, or 103 in FIG. 1) may receive the preset threshold for the B-frame number transmitted from external, and determine the initial video frame structure based on the preset threshold for the B-frame number. The method for determining an initial video frame structure based on a preset threshold for the B-frame number may include: based on the preset threshold for the B-frame number, in all of the video frame structures having the number of B frames less than or equal to the preset threshold for the B-frame number, determining the longest video frame structure having a length satisfying a power of two, and determining the determined longest video frame structure as the initial video frame structure. For example, when the preset threshold for the B-frame number is 9, the longest video frame structure having a length of 8 may be determined and used as the initial video frame structure. The longest video frame structure may be a video frame structure composed of one P frame and several B frames. For example, the longest video frame structure having the length of 8 includes one P frame and seven B frames. Or, when the preset threshold for the B-frame number is 15, the longest video frame structure having a length of 16 may be determined, and the longest video frame structure having the length of 16 includes 15 B frames and one P frame.

Step 202, in response to determining that the initial video frame structure meets a preset condition, shortening the initial video frame structure to obtain a candidate video frame structure set.

In the present embodiment, the preset condition may be used to identify coding performance of a video frame structure, where the preset condition may include but is not limited to: in a pre-coding process, the proportion of an intra-frame block during inter-frame coding exceeds a first threshold; or a ratio of an average number of bits consumed by B frame to an average number of bits consumed by P frame exceeds a second threshold. If the initial video frame structure meets the preset condition, it indicates that the initial video frame structure cannot meet the requirements of a current coding scenario. In this regard, it is necessary to re-determine a video frame structure for video coding. The initial video frame structure may be shortened to obtain a candidate video frame structure set, so as to select the target video frame structure from the candidate video frame structure set. If the initial video frame structure does not meet the preset condition, it indicates that the initial video frame structure may meet the requirements of the current coding scenario. In this regard, the initial video frame structure may be directly determined as the target video frame structure, and video coding is performed on the video frames in the to-be-coded video frame sequence according to the target video frame structure.

Alternatively, the method for shortening the initial video frame structure to obtain the candidate video frame structure set may include: shortening the initial video frame structure based on a preset B-frame shortening number to obtain a shortened video frame structure, and obtaining the candidate video frame structure set based on the shortened video frame structure. For example, the preset B-frame shortening number may be 2. In this regard, the number of B frames in the initial video frame structure may be reduced by 2, then the shortened video frame structure is obtained, and the shortened video frame structure may be added to the candidate video frame structure set.

Further and alternatively, after obtaining the candidate video frame structure set, the following steps may also be performed: determining a candidate video frame structure in the candidate video frame structure set as the initial video frame structure, and continuing performing the steps of: shortening the initial video frame structure in response to determining that the initial video frame structure meets the preset condition; and determining the initial video frame structure as the target video frame structure in response to determining that the initial video frame structure does not meet the preset condition, and performing video coding on the video frames in the to-be-coded video frame sequence.

Step 203, determining the target video frame structure from the candidate video frame structure set.

In the present embodiment, the number of video frame structures in the candidate video frame structure set may be two or more. In this case, the target video frame structure may be determined from the candidate video frame structure set. The target video frame structure may be determined based on a preset selection condition. For example, the video frames in the to-be-coded video frame sequence may be pre-encoded according to each video frame structure in the candidate video frame structure set, and based on pre-coding results, an optimal target video frame structure is selected from the video frame structures. For example, the video frame structures in the candidate video frame structure set may be obtained based on the initial video frame structure and a preset shortening ratio, e.g., the preset shortening ratio may be one-half and three-quarters. In this regard, the candidate video frame structure set may include a video frame structure which is obtained by shortening the initial video frame structure to its one-half, and a video frame structure which is obtained by shortening the initial video frame structure to its three-quarters. In this regard, the target video frame structure may be determined from the candidate video frame structure set according to a preset selection condition. The preset selection condition may be used as a basis for selecting a video frame structure having the optimal coding performance for precoding.

Step 204, performing video coding on the video frames in the to-be-coded video frame sequence according to the target video frame structure.

In the present embodiment, if the candidate video frame structures obtained by shortening the initial video structure include a video frame structure that is capable of meeting the requirements of the current coding environment, that is, if the target video frame structure is capable of meeting the requirements of the current coding environment, video coding may be performed on the video frames in the to-be-coded video frame sequence according to the target video frame structure. The position of Bref frame in the target video frame structure may be determined based on the number of frames in the target video frame structure. For example, when the number of frames in the target video frame structure meets a power of 2, a B frame in the middle position of the target video frame structure may be used as the first layer Bref frame, and if the number of consecutive B frames positioned between the Bref frame and a previous or subsequent reference frame is greater than 1, the layer of the Bref frame may be further split. Or if the number of frames in the target video frame structure meets 3 times a power of 2, a B frame in the middle position of the target video frame structure may be used as a first layer Bref frame, and if the number of consecutive B frames positioned between the Bref frame and a previous or subsequent reference frame is greater than 2, the layer of the Bref frame may be further split. The to-be-coded video frame sequence may be a video frame sequence corresponding to a video that needs to be coded, and the video frames in the video frame sequence may be combined into a consecutive video that needs to be coded. The method for performing video coding on the video frames in a to-be-coded video frame sequence may include: determining a frame type corresponding to each video frame as a frame type in a corresponding position in the target video frame structure, and coding the video frame based on the frame type. For example, when the frame type of a video frame is P frame, the video frame may be compressed based on a difference between the video frame and a previous video frame whose frame type is I frame or P frame, and when the frame type of a video is B frame, the video frame may be compressed based on a difference between the video frame and previous and subsequent video frames.

The method for coding a video provided in the above embodiment of the present disclosure, may determine the initial video frame structure based on the preset threshold for the B-frame number; if the initial video frame structure meets the preset condition, it indicates that the initial video frame structure is not capable of meeting the requirements of the current coding scenario; in this regard, the initial video frame structure may be shortened to obtain the candidate video frame structure set; based on the target video frame structure determined from the candidate video frame structure set, video coding may be performed on the video frames in the to-be-coded video frame sequence. This process may dynamically switch the video frame structure used in video coding based on the preset condition, and when the initial video frame structure meets the preset condition, the shortened video frame structure may be determined as the video frame structure used in video coding, which is suitable for selecting matching target video frame structures for different coding scenarios, which improves coding effects.

Figure 3:
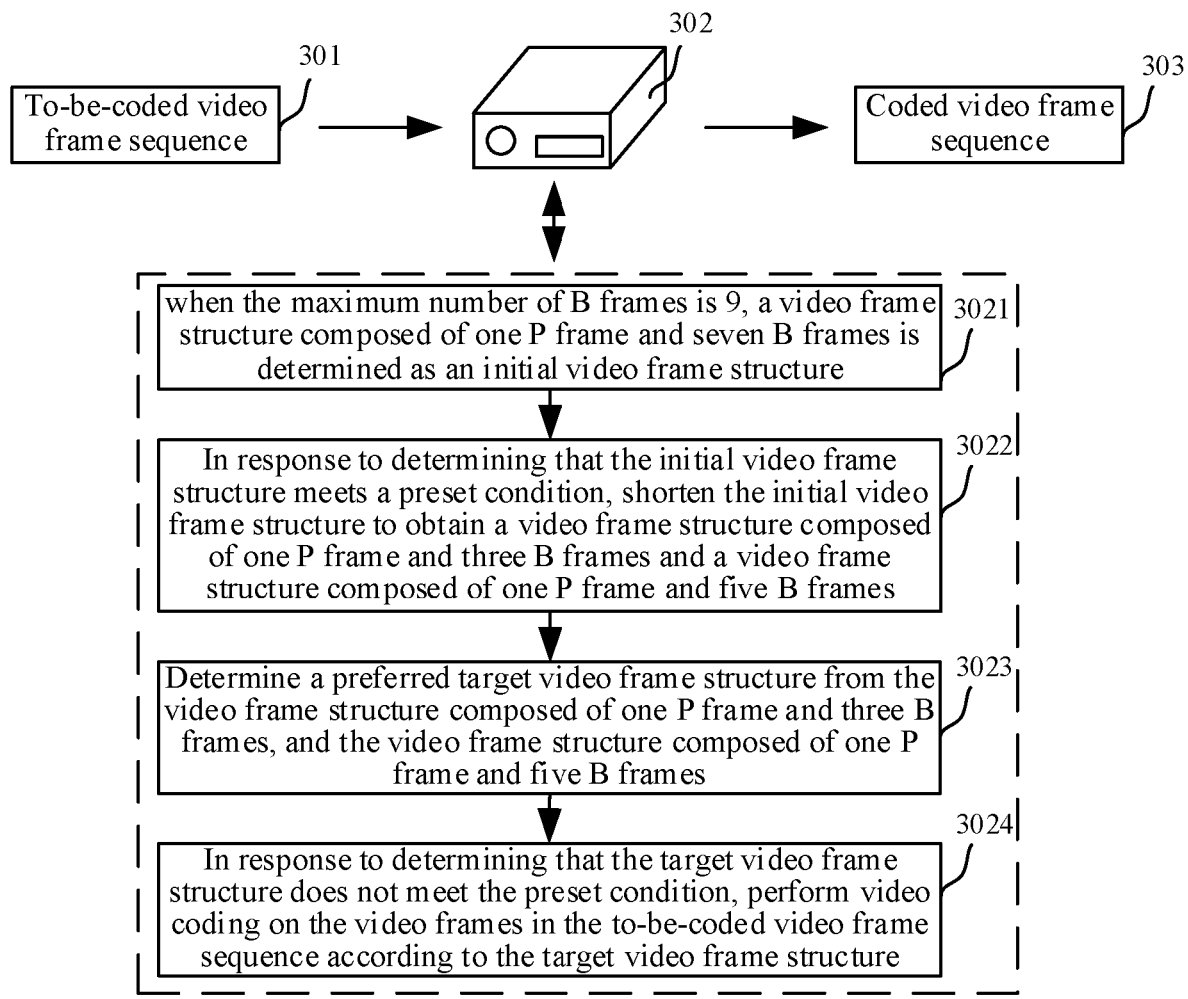
FIG. 3 is a schematic diagram of an application scenario of the method for coding a video according to an embodiment of the present disclosure.

With further reference to FIG. 3, illustrating a schematic diagram of an application scenario of the method for coding a video according to an embodiment of the present disclosure. In the application scenario of FIG. 3, the method for coding a video may be applied to a scenario where a video coder performs video coding on a target video. A video coder 302 may acquire a to-be-coded video frame sequence 301 corresponding to the target video. The to-be-coded video frame sequence 301 includes at least one video frame. After the video coder 302 performs the video coding operations, the video coder 302 may generate a coded video frame sequence 303 obtained after video coding each video frame in the to-be-coded video frame sequence. The video coder 302 may perform video coding operations as follows:

Step 3021, when the maximum number of B frames is 9, a video frame structure composed of one P frame and seven B frames is determined as the initial video frame structure.

Step 3022, in response to determining that the initial video frame structure meets a preset condition, shortening the initial video frame structure to obtain a video frame structure composed of one P frame and three B frames, and a video frame structure composed of one P frame and five B frames.

Step 3023, determining a preferred target video frame structure from the video frame structure composed of one P frame and three B frames and the video frame structure composed of one P frame and five B frames.

Step 3024, in response to determining that the target video frame structure does not meet the preset condition, performing video coding on the video frames in the to-be-coded video frame sequence based on the target video frame structure.

In the present embodiment, during the process of performing video coding on the video frames in the to-be-coded video frame sequence, the video frame structure having the maximum number of B frames may be determined as the initial video frame structure. For example, when the maximum number of B frames is 9, a maximum video frame structure having the number of frames meeting the power of 2, that is, the video frame structure composed of one P frame and seven B frames, may be determined as the initial video frame structure. If the initial video frame structure does not meet the preset condition, it indicates that the initial video frame structure is capable of meeting the requirements of the current coding environment, and in this regard, video coding may be directly performed on the video frames in the to-be-coded video frame sequence according to the initial video frame structure. The preset condition may be, when the video frame structure is used to perform video coding on the video frame in the to-be-coded video frame sequence, whether the proportion of the intra-frame block during inter-frame coding exceeds a first threshold, or whether a ratio of an average number of bits consumed by B frame to an average number of bits consumed by P frame exceeds a second threshold. If the proportion of the intra-frame block during inter-frame coding exceeds the first threshold and/or the ratio of the average number of bits consumed by B frame to the average number of bits consumed by P frame exceeds the second threshold, it indicates that the video frame structure meets the preset condition. If the proportion of the intra-frame block during the inter-frame coding does not exceed the first threshold and/or the ratio of the average number of bits consumed by B frame to the average number of bits consumed by P frame does not exceed the second threshold, it indicates that the video frame structure does not meet the preset condition. If the initial video frame structure meets the preset condition, it indicates that the initial video frame structure is not capable of meeting the requirements of the current coding environment, and in this regard, the initial video frame structure may be shortened. During the shortening, the initial video frame structure may be shortened based on a preset shortening ratio. For example, the preset shortening ratio may be one-half and three-quarters. Since the number of frames in the video frame structure composed of one P frame and seven B frames is 8, the video frame structure obtained by shortening to one-half is a video frame structure having the number of frames of 4, that is, a video frame structure composed of one P frame and three B frames, and the video frame structure obtained by shortening to three-quarters is a video frame structure having the number of frames of 6, that is, a video frame structure composed of one P frame and five B frames. Based on a preset selection condition, the preferred target video frame structure may be determined from the video frame structure composed of one P frame and three B frames and the video frame structure composed of one P frame and five B frames. If the target video frame structure does not meet the preset condition, video coding may be performed on the video frames in the to-be-coded video frame sequence according to the target video frame structure. This process may ensure that the video frame structure for performing video coding on the video frames in the to-be-coded video frame sequence does not meet the preset condition, that is, the video frame structure is capable of matching the requirements of the current coding environment, thereby improving coding effects.

Figure 4:
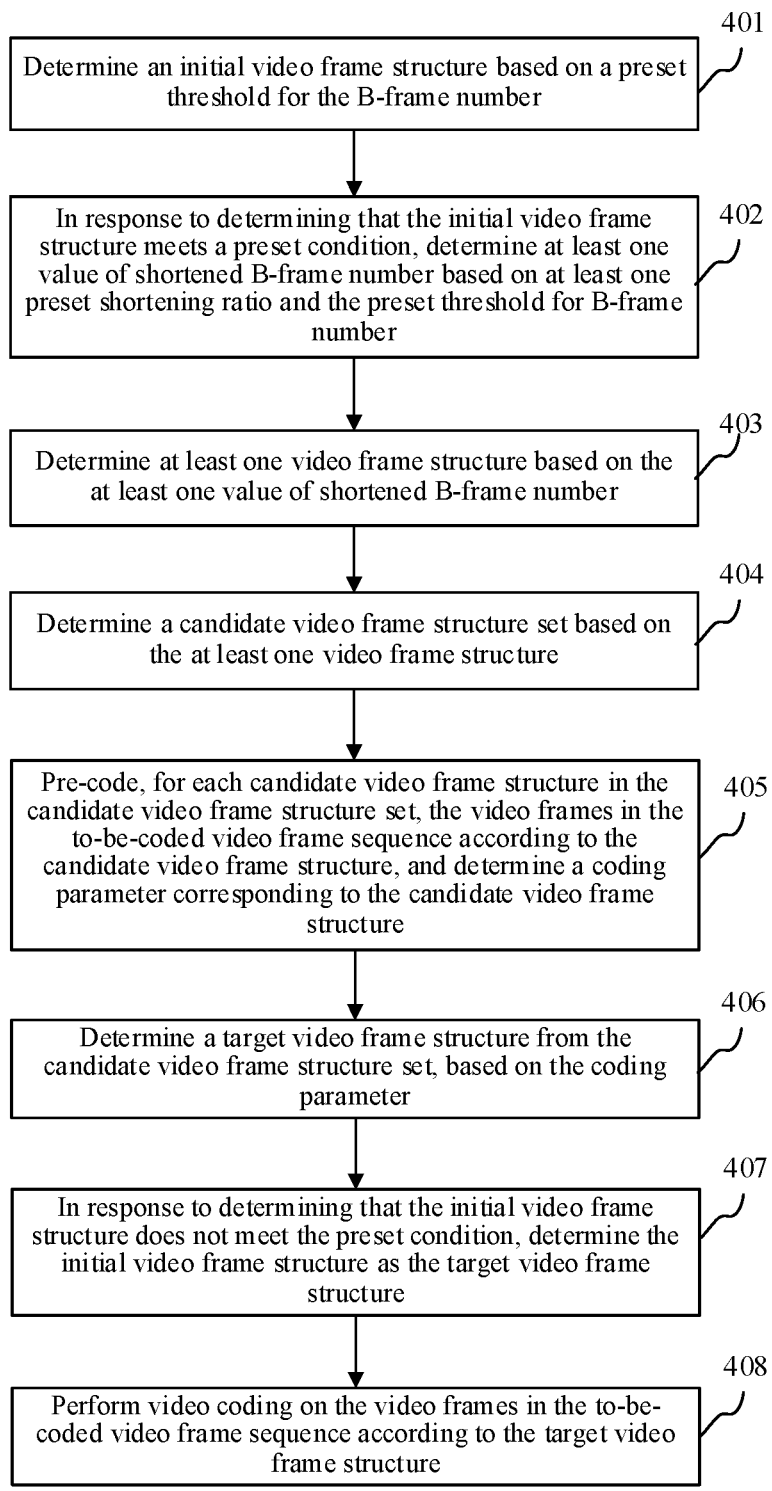
FIG. 4 is a flowchart of a method for coding a video according to another embodiment of the present disclosure.

With further reference to FIG. 4, illustrating a flow 400 of a method for coding a video according to another embodiment of the present disclosure. As shown in FIG. 4, the method for coding a video of the present embodiment may include the following steps:

Step 401, determining an initial video frame structure based on a preset threshold for the B-frame number.

In the present embodiment, a video frame structure having the number of B frames being the preset threshold for the B-frame number may be determined as the initial video frame structure. For an explanation of step 401, reference may be made to the explanation of step 201, and detailed description thereof will be omitted.

Step 402, in response to determining that the initial video frame structure meets a preset condition, determining at least one value of a shortened B-frame number based on at least one preset shortening ratio and the preset threshold for the B-frame number.

In the present embodiment, at least one shortening ratio may be preset. The shortening ratio is used to indicate a shortening ratio of the number of frames in the video frame structure. For example, when the shortening ratio is one-half, it indicates that the number of frames in the video frame structure needs to be shortened to its one-half, or when the shortening ratio is three-quarters, it indicates that the number of frames in the video frame structure needs to be shortened to its three-quarters. The number of frames in the video frame structure may be determined by the preset threshold for the B-frame number. Since the initial video frame structure is a structure composed of one P frame and B frames of the preset threshold for the B-frame number, the number of frames in the initial video frame structure is the preset threshold for the B-frame number plus one. Based on the number of frames in the initial video frame structure and the shortening ratio, the value for the shortened B-frame number may be calculated. The method for determining at least one value of shortened B-frame number based on at least one preset shortening ratio and the preset threshold for the B-frame number may include: determining the number of frames in the initial video frame structure based on the preset threshold for the B-frame number, where the number of frames in the initial video frame structure is the preset threshold for the B-frame number plus one, and multiplying respectively the number of frames in the initial video frame structure by the at least one shortening ratio to obtain the value of the shortened B-frame number corresponding to each shortening ratio. For example, if the at least one shortening ratio includes one-half and three-quarters, and the preset threshold for the B-frame number is 11, the number of frames in the initial video frame structure may be calculated to be 12, and 12 is multiplied by one-half and three-quarters respectively, to obtain the values of shortened B-frame number of 6 and 9. The value of shortened B-frame number is used to describe the number of frames of the shortened video frame structure.

Step 403, determining at least one video frame structure based on the determined at least one value of shortened B-frame number.

In the present embodiment, if the value of the shortened B-frame number is 6, the corresponding video frame structure is a video frame structure composed of one P frame and five B frames. If the value of the shortened B-frame number is 9, then the corresponding video frame structure is a video frame structure composed of one P frame and eight B frames. Each value of shortened B-frame number corresponds to a video frame structure.

Step 404, determining a candidate video frame structure set based on the at least one video frame structure.

In the present embodiment, the at least one video frame structure may be added to a candidate video frame structure set, to determine the candidate video frame structure set.

In some alternative implementations of the present embodiment, the determining a candidate video frame structure set, based on the at least one video frame structure, includes: determining, for each video frame structure in the at least one video frame structure, the video frame structure as a candidate video frame structure in response to determining that a number of frames in the video frame structure meets a preset length condition.

In the present embodiment, the preset length condition may be that the number of frames meets a power of 2 or the number of frames meets 3 times a power of 2. For the obtained at least one video frame structure, a video frame structure having the number of frames meeting a power of 2 or meeting 3 times a power of 2 in the at least one video frame structure may be determined as the candidate video frame structure, to obtain the candidate video frame structure set. Alternatively, if none of the obtained at least one video frame structure meets the preset length condition, the initial video frame structure may be directly determined as the target video frame structure.

In some alternative implementations of the present embodiment, the preset length condition includes a first preset length condition and a second preset length condition; and the determining the video frame structure as the candidate video frame structure in response to determining that the number of frames in the video frame structure meets the preset length condition, includes: in response to determining that the video frame structure meets the first preset length condition, determining at least one layer of frame position in the video frame structure based on a first preset number of consecutive B frames; and in response to determining that the video frame structure meets the second preset length condition, determining the at least one layer of frame position in the video frame structure based on a second preset number of consecutive B frames; replacing a frame corresponding to the at least one layer of frame position in the video frame structure with a Bref frame, to obtain the candidate video frame structure.

In the present embodiment, the first preset length condition may be that the above number of frames meets a power of 2, and the second preset length condition may be that the above number of frames meets 3 times a power of 2. If the number of frames of a video frame structure in the candidate video frame structure meets a power of 2, the at least one layer of frame position in the video frame structure may be determined based on the first preset number of consecutive B frames. If the number of frames of a video frame structure in the candidate video frame structure meets 3 times a power of 2, the at least one layer of frame position in the video frame structure may be determined based on the second preset number of consecutive B frames. The first preset number of consecutive B frames may be 1, and the second preset number of consecutive B frames may be 2. Alternatively, the method for determining at least one layer of frame position in the video frame structure based on a first preset number of consecutive B frames may include: determining a frame corresponding to a middle position in the video frame structure as a first layer frame position; determining the first layer frame position as a target layer frame position; and performing layer position determination operations on the target layer frame position as follows: in response to an interval between the target layer frame position and a preceding or subsequent reference frame being greater than the first preset number of consecutive B frames, determining a middle position between the target layer frame position and the preceding reference frame and a middle position between the target layer frame position and the subsequent reference frame as next layer frame positions; in response to an interval between the next layer frame position and a preceding or subsequent reference frame being greater than the first preset number of consecutive B frames, determining the next layer frame position as the target layer frame position, and continuing performing the above layer position determination operations until the interval between the next layer frame position and a preceding or subsequent reference frame is less than or equal to the first preset number of consecutive B frames, acquiring frame positions of the various layers. Further and alternatively, the method for determining at least one layer of frame position in the video frame structure based on a second preset number of consecutive B frames may include: determining a frame corresponding to a middle position in the video frame structure as a first layer frame position; determining the first layer frame position as a target layer frame position; and performing layer position determination operations on the target layer frame position as follows: in response to an interval between the target layer frame position and a preceding or subsequent reference frame being greater than the second preset number of consecutive B frames, determining a middle position between the target layer frame position and the preceding reference frame and a middle position between the target layer frame position and the subsequent reference frame as next layer frame positions; in response to an interval between a next layer frame position and a preceding or subsequent reference frame being greater than the second preset number of consecutive B frames, determining the next layer frame position as the target layer frame position, and continuing performing the above layer position determination operations until the interval between the next layer frame position and the preceding and subsequent reference frames is less than or equal to the second preset number of consecutive B frames, acquiring frame positions of the various layers. In addition, the frame corresponding to the at least one layer of frame position in the video frame structure may also be replaced with a Bref frame, to obtain the candidate video frame structure.

For example, for a video frame structure composed of one P frame and fifteen B frames, since the number of frames is 16, which meets a power of 2, the position corresponding to the eighth B frame in the middle position may be determined as the first layer frame position. Since the interval between the first layer frame position and the preceding or subsequent reference frame is greater than one, in this regard, the position corresponding to the fourth B frame and the position corresponding to the twelfth B frame may be further determined as a second layer frame position. Since an interval between the second layer frame position and a preceding or subsequent reference frame is greater than 1, the positions corresponding to the second, sixth, tenth, and fourteenth B frames may be determined as a third layer frame position. Finally, the B frames at the second, fourth, sixth, eighth, tenth, twelfth, and fourteenth frame positions may be replaced with Bref frames to obtain the candidate video frame structure. Or, for a video frame structure composed of one P frame and eleven B frames, since the number of frames is 12, which meets 3 times a power of 2, the position corresponding to the sixth B frame may be determined as the first layer frame position. Since the interval between the first layer frame position and the preceding or subsequent reference frame is greater than 2, the positions corresponding to the third and ninth B frames may be determined as a second layer frame position. Finally, the B frames at the third, sixth, and ninth frame positions may be replaced with Bref frames to obtain the candidate video frame structure.

Step 405, pre-coding, for each candidate video frame structure in the candidate video frame structure set, the video frames in the to-be-coded video frame sequence according to the candidate video frame structure, and determining a coding parameter corresponding to the candidate video frame structure.

In the present embodiment, for each candidate video frame structure in the candidate video frame structure set, the video frames in the to-be-coded video frame sequence may be pre-coded according to the candidate video frame structure, and the number of bits consumed by the pre-encoding corresponding to the candidate video frame structure, a ratio of an average number of bits consumed by inter-frame coding mode to an average number of bits consumed by intra-frame coding mode, and the proportion of the intra-frame block in the inter-frame mode may be acquired. Alternatively, the number of bits consumed by the precoding may be multiplied by a corresponding first weight to obtain a first product; the ratio of an average number of bits consumed by inter-frame coding mode to an average number of bits consumed by intra-frame coding mode may be multiplied by a second weight to obtain a second product; the proportion of the intra-frame block in inter-frame mode may be multiplied by a third weight to obtain a third product; a sum of the first product, the second product and the third product is calculated; and a candidate video frame structure having the smallest sum of products in the candidate video frame structure set is determined as the target video frame structure. Here, the coding parameter may be the above number of bits consumed by the precoding, the ratio of an average number of bits consumed by the inter-frame coding mode to an average number of bits consumed by intra-frame coding mode, and/or the proportion of intra-frame block in inter-frame mode.

Step 406, determining the target video frame structure from the candidate video frame structure set, based on the coding parameter.

In the present embodiment, the video frame structure having the smallest weighted sum of coding parameters may be determined as the target video frame structure, to select a video frame structure with the optimal coding effect, and video coding is performed on the video frames in the to-be-coded video frame sequence.

Step 407, in response to determining that the initial video frame structure does not meet the preset condition, determining the initial video frame structure as the target video frame structure.

In the present embodiment, if the initial video frame structure does not meet the preset condition, it indicates that the initial video frame structure may be adapted to the requirements of the current coding scenario, and in this regard, the initial video frame structure is determined as the target video frame structure.

Alternatively, the performing video coding on the video frames in a to-be-coded video frame sequence according to the target video frame structure, may include: in response to the target video frame structure not meeting the preset condition, performing video coding on the video frames in the to-be-coded video frame set according to the target video frame structure. If the target video frame structure meets the above preset condition, the target video frame structure is determined as a new initial video frame structure, and the above operations, including shortening, in response to determining that the initial video frame structure meets a preset condition, the initial video frame structure to obtain a candidate video frame structure set, determining a target video frame structure from the candidate video frame structure set, are performed repeatedly.

Step 408, performing video coding on the video frames in the to-be-coded video frame sequence according to the target video frame structure.

In the present embodiment, for the description of step 408, reference may be made to the description of step 204, and detailed description thereof will be omitted.

It can be seen from FIG. 4 that, compared with the embodiment corresponding to FIG. 2, the flow 400 of the method for coding a video in the present embodiment may also shorten the initial video frame structure based on different shortening ratios to obtain the candidate video frame structure set, and select, based on the coding parameter of each candidate video frame structure in the candidate video frame structure set, a video frame structure for inserting a multi-layered Bref frames according to a preset manner from the candidate video frame structure set as the target video frame structure. This process is capable of selecting a target video frame structure with excellent coding performance and built with a multi-layered Bref frame. Since Bref frame may be used as a reference frame, an interval between B frame and a reference frame is shortened, further improving coding performance. In addition, the target video frame structure is a video frame structure that meets the preset condition, the coding performance of the video frame structure has a certain guarantee, coding the video frames in the to-be-coded video frame sequence using the video frame structure may also have better coding performance.

Figure 5:
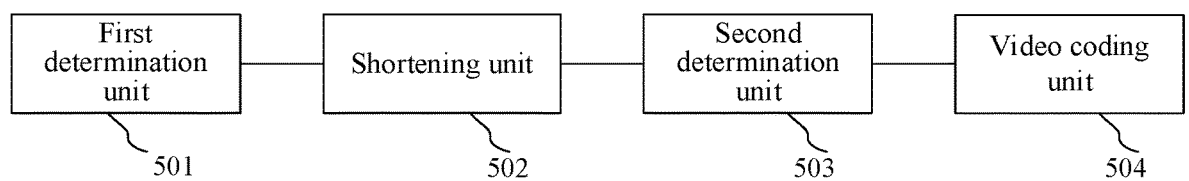
FIG. 5 is a schematic structural diagram of an apparatus for coding a video according to an embodiment of the present disclosure.

With further reference to FIG. 5, as an implementation of the method shown in the above figures, an embodiment of the present disclosure provides an apparatus for coding a video, and embodiments of the apparatus corresponds to embodiments of the method as shown in FIG. 2, and the apparatus may be applied to various electronic devices.

As shown in FIG. 5, the apparatus 500 for coding a video of the present embodiment includes: a first determination unit 501, a shortening unit 502, a second determination unit 503 and a video coding unit 504.

The first determination unit 501 is configured to determine an initial video frame structure based on a preset threshold for a B-frame number.

The shortening unit 502 is configured to shorten, in response to determining that the initial video frame structure meets a preset condition, the initial video frame structure to obtain a candidate video frame structure set.

The second determination unit 503 is configured to determine a target video frame structure from the candidate video frame structure set.

The video coding unit 504 is configured to perform video coding on video frames in a to-be-coded video frame sequence according to the target video frame structure.

In some alternative implementations of the present embodiment, the shortening unit 502 is further configured to: determine at least one value of a shortened B-frame number based on at least one preset shortening ratio and the preset threshold for the B-frame number; determine at least one video frame structure based on the at least one value of the shortened B-frame number; and determine, based on the at least one video frame structure, the candidate video frame structure set.

In some alternative implementations of the present embodiment, the shortening unit 502 is further configured to: determine, for each video frame structure in the at least one video frame structure, the video frame structure as a candidate video frame structure in response to determining that a number of frames in the video frame structure meets a preset length condition, to obtain the candidate video frame structure set.

In some alternative implementations of the present embodiment, the preset length condition includes a first preset length condition and a second preset length condition; and the shortening unit 502 is further configured to: in response to determining that the video frame structure meets the first preset length condition, determine at least one layer of frame position in the video frame structure based on a first preset number of consecutive B frames; in response to determining that the video frame structure meets the second preset length condition, determine the at least one layer of frame position in the video frame structure based on a second preset number of consecutive B frames; and replace a frame corresponding to the at least one layer of frame position in the video frame structure with a Bref frame, to obtain the candidate video frame structure.

In some alternative implementations of the present embodiment, the second determination unit 503 is further configured to: pre-code, for each candidate video frame structure in the candidate video frame structure set, the video frames in the to-be-coded video frame sequence according to the candidate video frame structure, and determine a coding parameter corresponding to the candidate video frame structure; and determine the target video frame structure from the candidate video frame structure set, based on the coding parameter.

In some alternative implementations of the present embodiment, the apparatus further includes: a third determination unit, configured to determine the initial video frame structure as the target video frame structure in response to determining that the initial video frame structure does not meet the preset condition.

It should be understood that the units 501 to 504 recorded in the apparatus 500 for coding a video respectively correspond to the steps in the method described with reference to FIG. 2. Therefore, the operations and features described above for the method for coding a video are also applicable to the apparatus 500 and the units included therein, and detailed description thereof will be omitted.

According to an embodiment of the present disclosure, an electronic device and a readable storage medium are provided.

Figure 6:
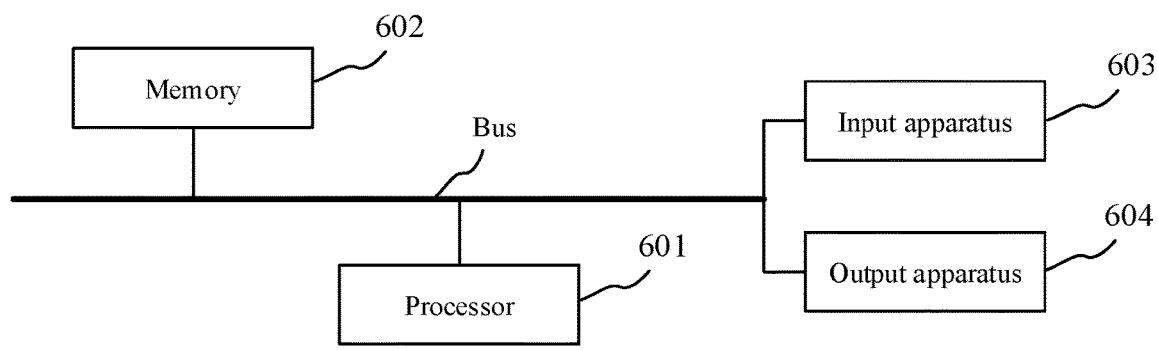
FIG. 6 is a block diagram of a device for coding a video used to implement the method for coding a video according to an embodiment of the present disclosure.

As shown in FIG. 6, is a block diagram of a device for coding a video used to implement the method for coding a video according to an embodiment of the present disclosure. The device for coding a video includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of devices may be connected, and the devices provide some necessary operations. In FIG. 6, one processor 601 is used as an example.

The memory 602 is a non-transitory computer readable storage medium provided by an embodiment of the present disclosure. The memory stores instructions executable by at least one processor, so that the at least one processor performs the method for coding a video provided by embodiments of the present disclosure. The non-transitory computer readable storage medium of the present disclosure stores computer instructions for causing a computer to perform the method for coding a video provided by embodiments of the present disclosure.

The memory 602, as a non-transitory computer readable storage medium, may be used to store non-transitory software programs, non-transitory computer executable programs and modules, such as program instructions/modules corresponding to the method for coding a video in embodiments of the present disclosure (for example, the first determination unit 501, the shortening unit 502, the second determination unit 503 and the video coding unit 504 as shown in FIG. 5). The processor 601 executes the non-transitory software programs, instructions, and modules stored in the memory 602 to execute various functional applications and data processing of the device, that is, to implement the method for coding a video in the foregoing method embodiments.

The memory 602 may include a storage program area and a storage data area, where the storage program area may store an operating system and at least one function required application program; and the storage data area may store data created by the use of the electronic device, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device through a network. Examples of the above network include but are not limited to the Internet, intranet, local area network, mobile communication network, and combinations thereof.

The video coding device may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device for encoding a video, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the solution provided in embodiments of the present disclosure, a method for video coding is provided, which is capable of improving the video coding performance.

It should be understood that the various forms of processes shown above may be used to reorder, add, or delete steps. For example, the steps described in the embodiments of present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for coding a video, the method comprising:
determining an initial video frame structure based on a preset threshold for a B-frame number;
in response to determining that the initial video frame structure meets a preset condition, shortening the initial video frame structure to obtain a candidate video frame structure set, wherein shortening the initial video frame structure to obtain the candidate video frame structure set comprises:
determining at least one value of a shortened B-frame number based on at least one preset shortening ratio and the preset threshold for the B-frame number;
determining at least one video frame structure based on the at least one value of the shortened B-frame number; and
determining, based on the at least one video frame structure, the candidate video frame structure set, wherein determining the candidate video frame structure set comprises: replacing a non-reference B frame located at a middle of a sequence of non-reference B frames in a video frame structure of the at least one video frame structure with a Bref frame, to obtain a candidate video frame structure, the Bref frame being a B-frame used as a reference frame;
determining a target video frame structure from the candidate video frame structure set; and
performing video coding on video frames in a to-be-coded video frame sequence according to the target video frame structure.

2. The method according to claim 1, wherein replacing the non-reference B frame located at the middle of the sequence of non-reference B frames in the video frame structure of the at least one video frame structure with the Bref frame, to obtain the candidate video frame structure, comprises:
in response to determining that the video frame structure meets a first preset length condition, determining at least one layer of frame position in the video frame structure based on a first preset number of consecutive B frames, wherein the at least one layer of frame position comprises a position at the middle of the sequence of non-reference B frames;
in response to determining that the video frame structure meets a second preset length condition, determining the at least one layer of frame position in the video frame structure based on a second preset number of consecutive B frames; and
replacing a frame corresponding to the at least one layer of frame position in the video frame structure with the Bref frame, to obtain the candidate video frame structure.

3. The method according to claim 1, wherein the determining the target video frame structure from the candidate video frame structure set, comprises:

pre-coding, for each candidate video frame structure in the candidate video frame structure set, the video frames in the to-be-coded video frame sequence according to the candidate video frame structure, and determining a coding parameter corresponding to the candidate video frame structure; and determining, based on the coding parameter, the target video frame structure from the candidate video frame structure set.

4. The method according to claim 1, wherein the method further comprises:

in response to determining that the initial video frame structure does not meet the preset condition, determining the initial video frame structure as the target video frame structure.

5. A device for coding a video, comprising:

one or more processors; and a storage apparatus, storing one or more programs thereon, the one or more programs, when executed by the one or more processors, cause the one or more processors to implement operations, the operations comprising:

determining an initial video frame structure based on a preset threshold for a B-frame number;

in response to determining that the initial video frame structure meets a preset condition, shortening the initial video frame structure to obtain a candidate video frame structure set, wherein shortening the initial video frame structure to obtain the candidate video frame structure set, comprises:

determining at least one value of a shortened B-frame number based on at least one preset shortening ratio and the preset threshold for the B-frame number;

determining at least one video frame structure based on the at least one value of the shortened B-frame number; and determining, based on the at least one video frame structure, the candidate video frame structure set, wherein determining the candidate video frame structure set comprises: replacing a non-reference B frame located at a middle of a sequence of non-reference B frames in a video frame structure of the at least one video frame structure with a Bref frame, to obtain a candidate video frame structure, the Bref frame being a B-frame used as a reference frame;

determining a target video frame structure from the candidate video frame structure set; and performing video coding on video frames in a to-be-coded video frame sequence according to the target video frame structure.

6. The method according to claim 1, wherein the preset condition comprises a first condition that in a pre-coding process, a proportion of an intra-frame block during inter-frame coding exceeds a first threshold.

7. The method according to claim 1, wherein the preset condition comprises a second condition that a ratio of an average number of bits consumed by B frame to an average number of bits consumed by P frame exceeds a second threshold.

8. The device according to claim 5, wherein replacing the non-reference B frame located at the middle of the sequence of non-reference B frames in the video frame structure of the at least one video frame structure with the Bref frame, to obtain the candidate video frame structure, comprises:

in response to determining that the video frame structure meets a first preset length condition, determining at least one layer of frame position in the video frame structure based on a first preset number of consecutive B frames, wherein the at least one layer of frame position comprises a position at the middle of the sequence of non-reference B frames;

in response to determining that the video frame structure meets a second preset length condition, determining the at least one layer of frame position in the video frame structure based on a second preset number of consecutive B frames; and replacing a frame corresponding to the at least one layer of frame position in the video frame structure with the Bref frame, to obtain the candidate video frame structure.

9. The device according to claim 5, wherein the determining the target video frame structure from the candidate video frame structure set, comprises:

pre-coding, for each candidate video frame structure in the candidate video frame structure set, the video frames in the to-be-coded video frame sequence according to the candidate video frame structure, and determining a coding parameter corresponding to the candidate video frame structure; and determining, based on the coding parameter, the target video frame structure from the candidate video frame structure set.

10. The device according to claim 5, wherein the operations further comprise:

in response to determining that the initial video frame structure does not meet the preset condition, determining the initial video frame structure as the target video frame structure.

11. A non-transitory computer readable storage medium, storing computer instructions executable by a computer, the computer instructions being used to cause the computer to perform operations, the operations comprising:

determining an initial video frame structure based on a preset threshold for a B-frame number;

in response to determining that the initial video frame structure meets a preset condition, shortening the initial video frame structure to obtain a candidate video frame structure set, wherein shortening the initial video frame structure to obtain the candidate video frame structure set, comprises:

determining at least one value of a shortened B-frame number based on at least one preset shortening ratio and the preset threshold for the B-frame number;

determining at least one video frame structure based on the at least one value of the shortened B-frame number; and determining, based on the at least one video frame structure, the candidate video frame structure set, wherein determining the candidate video frame structure set comprises: replacing a non-reference B frame located at a middle of a sequence of non-reference B frames in a video frame structure of the at least one video frame structure with a Bref frame, to obtain a candidate video frame structure, the Bref frame being a B-frame used as a reference frame;

determining a target video frame structure from the candidate video frame structure set; and performing video coding on video frames in a to-be-coded video frame sequence according to the target video frame structure.

12. The non-transitory computer readable storage medium according to claim 11, wherein replacing the non-reference B frame located at the middle of the sequence of non-reference B frames in the video frame structure of the at least one video frame structure with the Bref frame, to obtain the candidate video frame structure, comprises:
   in response to determining that the video frame structure meets a first preset length condition, determining at least one layer of frame position in the video frame structure based on a first preset number of consecutive B frames, wherein the at least one layer of frame position comprises a position at the middle of the sequence of non-reference B frames;
   in response to determining that the video frame structure meets a second preset length condition, determining the at least one layer of frame position in the video frame structure based on a second preset number of consecutive B frames; and
   replacing a frame corresponding to the at least one layer of frame position in the video frame structure with the Bref frame, to obtain the candidate video frame structure.

13. The non-transitory computer readable storage medium according to claim 11, wherein the determining the target video frame structure from the candidate video frame structure set, comprises:
   pre-coding, for each candidate video frame structure in the candidate video frame structure set, the video frames in the to-be-coded video frame sequence according to the candidate video frame structure, and determining a coding parameter corresponding to the candidate video frame structure; and
   determining, based on the coding parameter, the target video frame structure from the candidate video frame structure set.

14. The non-transitory computer readable storage medium according to claim 13, wherein the operations further comprise:
   in response to determining that the initial video frame structure does not meet the preset condition, determining the initial video frame structure as the target video frame structure.

\* \* \* \* \*

UNITED STATES PATENT AND TRADEMARK OFFICE
CERTIFICATE OF CORRECTION

| | |
|---|---|
| PATENT NO. | : 11,792,407 B2 |
| APPLICATION NO. | : 17/353329 |
| DATED | : October 17, 2023 |
| INVENTOR(S) | : Le Shi et al. |

It is certified that error appears in the above-identified patent and that said Letters Patent is hereby corrected as shown below:

In the Claims

Claim 14, Line 15, delete "13," and insert -- 11, --.

Signed and Sealed this
Second Day of January, 2024

Katherine Kelly Vidal
*Director of the United States Patent and Trademark Office*